(12) United States Patent
Zaghib et al.

(10) Patent No.: US 7,897,674 B2
(45) Date of Patent: Mar. 1, 2011

(54) POLYMER ELECTROLYTE WITH HIGH STABILITY, ITS USE IN ELECTROCHEMICAL SYSTEMS

(75) Inventors: Karim Zaghib, Longueuil (CA); Michel Perrier, Montreal (CA); Abdelbast Guerfi, Brossard (CA); Elisabeth Dupuis, McMasterville (CA); Patrick Charest, Ste-Julie (CA); Francois Allaire, Trois Rivieres (CA); Michel Armand, Montreal (CA)

(73) Assignee: Hydro-Quebec, Montreal, Quebec (CA)

( * ) Notice: Subject to any disclaimer, the term of this patent is extended or adjusted under 35 U.S.C. 154(b) by 601 days.

(21) Appl. No.: 10/501,844

(22) PCT Filed: Jan. 15, 2003

(86) PCT No.: PCT/CA03/00052
§ 371 (c)(1),
(2), (4) Date: Jun. 10, 2005

(87) PCT Pub. No.: WO03/063287
PCT Pub. Date: Jul. 31, 2003

(65) Prior Publication Data
US 2005/0234177 A1 Oct. 20, 2005

(30) Foreign Application Priority Data
Jan. 16, 2002 (CA) .................... 2367290

(51) Int. Cl.
*C08L 1/00* (2006.01)
(52) U.S. Cl. ......... 524/435; 524/437; 524/493; 524/502; 524/544; 524/545; 524/556

(58) Field of Classification Search .................. 524/435, 524/437, 493, 502, 544, 545, 556
See application file for complete search history.

(56) References Cited

U.S. PATENT DOCUMENTS

| | | | |
|---|---|---|---|
| 5,356,555 A | 10/1994 | Huth et al. | |
| 5,436,090 A | 7/1995 | Kono et al. | |
| 6,190,804 B1 * | 2/2001 | Ishiko et al. | 429/306 |
| 6,280,882 B1 | 8/2001 | Vallee et al. | |
| 6,399,254 B1 * | 6/2002 | Kono et al. | 429/304 |

(Continued)

FOREIGN PATENT DOCUMENTS

EP 0 880 189 A2 11/1998
EP 923147 A2 * 6/1999

(Continued)

OTHER PUBLICATIONS

CSA's Search Abstract, Poly(methyl methacrylate) and polystyrene/clay nanocomposites prepared in situ bulk polymerization, Macromolecules (USA), Jun. 4, 2004, vol. 34, No. 12, pp. 4098-4103.

(Continued)

*Primary Examiner* — Peter D. Mulcahy
*Assistant Examiner* — Henry Hu
(74) *Attorney, Agent, or Firm* — Buchanan Ingersoll & Rooney PC (57) ABSTRACT

Polymer electrolyte for an electrochemical generator based on at least a four branched polymer, at least a poly(vinylyldienefluoride), a poly(vinyldiene fluoro-co-hexafluoropropene copolymer), a poly(tetrafluoroethylene), a poly(ethylene-co-propylene-co-5-methylene-2-norbornene) or an ethylene propylene-diene copolymer, a polyol, a poly(methylmethacrylate, a poly(acrylonitrile), $SiO_2Al_2O_3$, or nano $TiO_2$ non coated or coated with an organic material. This electrolyte allows to prepare electrolytic compositions that can be used in high performance electrochemical devices.

6 Claims, 6 Drawing Sheets

U.S. PATENT DOCUMENTS

| | | | |
|---|---|---|---|
| 6,596,803 B2 * | 7/2003 | Lan et al. ................... | 524/445 |
| 6,673,273 B2 * | 1/2004 | Ba Le et al. ................. | 252/511 |
| 7,101,643 B2 * | 9/2006 | Kerr et al. ................... | 429/313 |

FOREIGN PATENT DOCUMENTS

| | | | |
|---|---|---|---|
| EP | 880189 A2 * | 11/1999 | |
| JP | 03177409 | 1/1991 | |

OTHER PUBLICATIONS

English translation of International Preliminary Report of Patentability issued in corresponding PCT/CA2003/000052 on Aug. 10, 2005.

* cited by examiner

FIG_1

FIG_2

FIG_3

FIG_4

FIG. 5

FIG_6

FIG. 7

POLYMER ELECTROLYTE WITH HIGH STABILITY, ITS USE IN ELECTROCHEMICAL SYSTEMS

FIELD OF THE INVENTION

The present invention relates to electrolytes and electrolytic compositions with high performance, particularly with high stability, and to electrochemical systems using these electrolytes and/or these electrochemical compositions.

STATE OF THE ART

The marketing of the lithium-ion battery by Sony described by T. Nagura in $3^{rd}$ Rechargeable Battery Seminar, Deerfield Beach, Fla. (1990) has allowed an expansion and an important breakthrough of the batteries in the field of portable electronic devices such as telephones and computers. The technology of Li-ion batteries is based on electrodes with lithium intercalation; the anode consists of graphite and the cathode consists of metal oxides ($LiCoO_2$, $LiMnO_4$, $LiNiO_2$). During the first charge, a passivation film is formed at the carbon surface. The chemistry and composition of this passivation film are complex. The electrochemical protocol of this film remains an industrial secret. From 1990 to 1999, the chemistry of the Li-ion battery was essentially based on the use of liquid electrolytes. An extrapolation of the same chemistry to large volumes for applications in the field of electrical cars remains problematic because of the reactivity of the liquid electrolyte that involves the security of the battery on a large scale.

Starting in 1999, the so-called <<Li-ion polymer>> technology was marketed particularly by Japanese firms. This technology uses gelled polymers (<<gels>>) as electrolyte, the proportion of polymer in the electrolyte varying from 5 to 10% by weight. The anode is of the graphite type, the cathode is of the $LiCoO_2$ type. The average voltage of this technology is 3.6 volts. One of the advantages of this technology resides in the simplification, in particular for generators of prismatic shape, that are more and more in demand. The absence of free liquid allows the use of wrappings of the type <<metal plastic laminate>> that are flexible and impervious, which is accompanied by an increase of the mass and volumetric specific energy. The electrochemical power obtained by using this technology is however limited to discharge speeds <2C (charge—discharge in 30 minutes).

The use of polyethers as electrolytes in generators was described by DKS in U.S. Pat. No. 5,356,553, by Yuasa Inc. in U.S. Pat. No. 5,436,090 and by Hydro-Quebec in U.S. Pat. No. 6,280,882. The polyethers mentioned in these documents are stable at a voltage <3.9 volts and are compatible with polymer electrolyte technologies such as those developed by Hydro-Québec which uses cathodes of the vanadium oxide type between 2.2 and 3.4 volts, or recently of the $LiFePO_4$ type and which operate at a constant voltage of 3.5 volts. In return, this type of polyether has appeared to be unstable with cathodes of the 4 or 5 volt type that use $LiMn_2O_4$ or $LiCoPO_4$ based cathodes.

These technologies allow to have energy and power that extend up to a yield of 12 C (charge-discharge in 5 minutes). This technology operates at voltages higher than 4 volts versus $Li^+/Li$. To increase the security of the generators using this technology and to farther increase the available energy density, a stable polymer gel electrolyte must be used at voltages >4 volts.

On the other hand, it is known that the polymers of the star type allow, including in the case of polyethers, to decrease the tendency to crystallize which indicates instability. Polymers of the star type with 3 branches derived from glycerol or trimethylol propane have been used to constitute polymer electrolytes, that are cross-linkable through acrylate or methacrylate terminations.

There was therefore a need for electrolytes and electrolytic compositions that are deprived of some of the disadvantages of the electrolytes of the prior art and which have a good stability during cycling.

SUMMARY OF THE INVENTION

The present invention relates to a polymer electrolyte based on at least one four branched polymer having a substantial electrochemical stability. This polymer electrolyte also called HVSP (High Voltage Stable Polymer) can advantageously be used in electrochemical systems.

The present invention also relates to electrolytic compositions obtained by cross-linking the polymer electrolytes of the invention.

Another object of the present invention relates to processes allowing the preparation of a dry or plasticizing polymer and its use particularly in the field of hybrid super condensers and electrochemical generators.

Finally, the present invention relates to electrochemical devices, particularly to super condensers including at least one electrolyte and/or at least one electrolytic composition according to the invention.

The present invention also relates to processes allowing the preparation of a dry or plasticizing polymer and to its use particularly in the field of hybrid super condensers and electrochemical generators.

GENERAL DESCRIPTION OF THE INVENTION

Within the scope of the present invention, the expression electrochemical device covers particularly batteries, super condensers and hybrid super condensers.

A battery is an electrochemical device including at least one anode and one cathode made with an insertion material or a conducting polymer.

A super condenser includes at least two double layer electrodes without insertion and does not rely on an insertion reaction.

A hybrid super condenser includes at least one insertion electrode and at least one double layer electrode.

A battery or a super condenser is generally represented as follows:

Anode/Electrolyte/Cathode: (I)

A first object of the present invention resides in the family of polymer electrolytes for an electrochemical generator based on:

- at least one four branched polymer preferably having hybrid terminations, more preferably still, hybrid acrylate (preferably methacrylate) and alkoxy (preferably alkoxy having 1 to 8 carbon atoms, still more preferably methoxy or ethoxy) terminations, or vinyl terminations, at least one branch of said four branched polymer (and preferably at least two branched) being capable of giving rise to cross-linking;
- at least one component selected from the following families:
  - poly(vinylyldienefluorides), also called (PVDF), of chemical formula $(CH_2—CF_2)_n$, where n preferably varies between 1,000 and 4,000, preferably such that n is near 150, preferably those having an average molecular weight between 10,000 and 1 million, more preferably still those having an average molecular weight between 100,000 and 250,000;
  - poly(vinylydiene fluoro-co-hexafluoropropene) copolymers, of formula $[(CH_2—CF_2)_x(CF_2—CF(CF_3))_{1-x}]_n$ also called (PVDF-HFP), wherein n varies between 1,000 and 4,000, preferably n varies from 2,000 to 3,000, more preferably still n is near 150 and x varies preferably between 0.12 and 0.5, preferably those having an average molecular weight between 10,000 and 1 million, more preferably still those having an average molecular weight between 100,000 and 250,000;
  - poly(tetrafluoroethylenes), also called (PTFE), of chemical formula $(CF_2—CF_2)_n$, wherein n varies from 5 to 20,000, preferably n varies from 50 to 10,000, preferably those having an average molecular weight between 500 and 5 million, more preferably still those having an average molecular weight between 5,000 and 1,000,000, preferably about 200,000;
  - poly(ethylene-co-propylene-co-5-methylene-2-norbornenes) or ethylene propylene-diene copolymers, also called EPDM, preferably those having an average molecular weight between 10,000 and 250,000, preferably between 20,000 and 100,000;
  - polyols, preferably polyols such as:
    - a polyvinyl alcohol having an average molecular weight preferably between 50,000 and 1 million, or a cellulose, preferably having an average molecular weight between 5,000 and 250,000 in which part of the OH groups are replaced by $OCH_3$, $OC_2H_5$, $OCH_4OH$, $OCH_2CH(CH_3)OH$, $OC(=O)CH_3$, or $OC(=O)C_2H_5$, and/or
    - ethylene oxide condensation products, preferably those having an average molecular weight between 1,000 and 5,000, preferably pure or in admixture with propylene oxide on glycerol or trimethylolpropane, and possibly cross-linked with a di or tri-isocyanate of formula $(O=C=N)_x—R$ in which $2<x<4$ and R represents an aryl or alkyl group ensuring polyfunctionality with the group $(O=C=N)_x$;
  - poly(methylmethacrylates) also called EMMA), of formula $[(CH_2—C(CH_3)/(CO_2CH_3)]_n$ wherein n preferably varies between 100 and 10,000, more preferably still n varies from 500 to 5,000, preferably those having an average molecular weight between 10,000 and 1 million, preferably those having an average molecular weight between 50,000 and 500,000;
  - poly(acrylonitriles), also called (PAN), of chemical formula $[(CH_2—CH(CN)]_n$ in which n varies from 150 to 18,800, more preferably still n varies from 300 to 4,000, preferably those having an average molecular weight between 10,000 and 1 million, more preferably still those having an average molecular weight between 20,000 and 200,000;
  - $SiO_2—Al_2O_3$; and
  - nano $TiO_2$ non coated or coated with an organic material that is preferably compatible (i.e. stable and/or generating no secondary parasite reaction), with one or more of the polymers defined in columns 1 and 2 of U.S. Pat. No. 6,190,804, the organic material preferably being selected from the group comprising at least one polyol and/or one polyethylene-polyoxyethylene copolymer and/or an inorganic material that is preferably $SiO_2$ and/or $Al_2O_3$.

Preferably, the four branched polymer is one of those defined in columns 1 and 2 of U.S. Pat. No. 6,190,804. This document is incorporated by reference in the present Application.

This polymer is preferably a star shaped polymer of the polyether type that has at least four branches with terminations containing the following groups: acrylate ou methacrylate and alkoxy, allyloxy and/or vinyloxy, in which at least one and preferably at least two of these groups are active to allow cross-linking. The stability voltage of an electrolytic composition according to the invention that contains this polymer is clearly higher than 4 volts.

According to a preferred embodiment of the present invention, the four branched polymer is a tetrafunctional polymer preferably having a high molecular weight and corresponding to the formula (I):

in which $R^1$ and $R^2$ each represent a hydrogen atom or a lower alkyl (preferably from 1 to 7 carbon atoms); $R^3$ represents a hydrogen atom or a methyl group; m and n each represent a whole number higher than or equal to 0; in each high molecular weight chain, $m+n \geq 35$; and each $R^1$, $R^2$, $R^3$ and each of the m and n parameters may be identical or different in the 4 high molecular weight chains.

According to another preferred embodiment of the present invention the High Voltage Stable Polymer (HVSP) consists of a star type polyether having at least four branches with a hybrid termination (acrylate or methacrylate and alkoxy, allyloxy, vinyloxy). It stability voltage is clearly higher than 4 volts.

According to a preferred embodiment of the invention, the polymer electrolyte additionally includes a salt, preferably a lithium salt, such as LiTFSI, or a mixture of salts with a plasticizing agent preferably consisting of an organic solvent.

According to another advantageous embodiment, the polymer electrolyte in the absence of solvent or plasticizing agent is in dry form (free solvent), as obtained by adding a lithium salt or a mixture of salts in the polymer matrix (ensuring ionic conductivity). The preferred lithium salts are those of the type; $LiN(SO_2CF_3)_2$; LiTFSI, $LiN(SO_2C_2F_5)_2$; BETI, $LiC(SO_2CF_3)_3$, $LiBF_4$, $LiPF_6$, $LiClO_4$, $LiSO_3CF_3$, $LiAsF_6$.

According to another advantageous embodiment, the polymer electrolytes of the invention contain a plasticizing agent consisting of at least one mixture of organic solvents preferably selected from the group consisting of; an ethylene carbonate, a propylene carbonate, a γ-gamma butyrolactone, a dimethyl carbonate, a diethyl carbonate, a tetra ethyl-sulfone amide, and a methyl-ethyl carbonate (EMC).

A second object of the present invention consists of the electrolytic compositions obtained from at least one polymer electrolyte according to the first object of the present application, preferably by subjecting the components of said electrolyte to conditions allowing their cross-linking.

According to an advantageous embodiment, cross-linking is carried out by UV, by heat treatment and/or by electron beam (EB).

The electrolytic compositions obtained by cross-linking in the presence of at least one lithium salt, are particularly interesting.

Those obtained by cross-linking in the absence of lithium salts are also interesting. These electrolytic compositions may be prepared in a reactor, however also in a battery or in a hybrid super condenser, once the latter is built. It is merely sufficient to introduce therein a polymer electrolyte of the invention and to carry out cross-linking in situ.

Cross-linking is advantageously carried out:
at a temperature between 50 and 100° C., preferably at a temperature between 60 and 80° C.; and/or
for a period of time between 5 minutes and 8 hours, preferably for a duration between 1 hour and 4 hours; and/or
in the presence of a cross-linking catalyst preferably selected from the group comprising peroxides, hydroperoxides and peresters, preferably the catalyst is selected from the group consisting of organic peroxides such as peroxycarbonates (benzoyl peroxide or azo compounds).

According to an advantageous embodiment, the electrolytic composition is in the form of a gel, this form being preferably obtained by the Doctor Blade method or by injection.

According to another advantageous embodiment, the electrolytic composition is in solid form, this form being obtained by the Doctor Blade method or by extrusion.

A third object of the present invention consists in an electrochemical device such as a battery, a super condenser or a hybrid super condenser comprising:
at least one electrolyte of the invention and/or at least one electrolytic composition according to the invention;
an electroactive anode preferably of the $Li_4Ti_5O_{12}$ type, and
a 3.5 to 5 volt type cathode such as those made from $LiCoPO_4$ and/or $Li(Mn_{0.66}Ni_{0.34})O_2$ or the like.

Another advantageous super condenser according to the invention comprises:
at least one polymer electrolyte and/or at least one electrolytic composition according to the invention;
an electroactive anode preferably of the $Li_4Ti_5O_{12}$ type; and
an electroactive cathode preferably of the carbon type with large surface area.

Preferably, carbon is in the form of particles having a specific surface larger than or equal to 2 m²/g and lower than or equal to 2500 m²/g, preferably in the form of particles having a specific surface that is larger than or equal to 50 m²/g, preferably between 50 and 2400 m²/g.

According to an advantageous embodiment, the electroactive cathode is of the conducting polymer type and preferably consists of at least one conducting polymer having high voltage such as a polyaniline and/or a polythiophene and/or an arylthiophene, preferably selected among the family of 3-arylthiophenes.

Preferably, the electroactive anode is of the GIC (Graphite Intercalation Compound) type, preferably made of natural and/or synthetic graphite, and/or highly crystalline carbon, preferably carbon is heat treated before being used to constitute the electrode, at temperatures >2000° C. (two thousand degrees Celsius).

According to a particularly advantageous variant, in these electrochemical devices, the electroactive anode consists of a layer of carbon of the low crystalline type, preferably a carbon treated at temperatures lower than or equal to 2000° Celsius and/or a hard carbon.

Preferably, the electrochemical devices or super condensers according to the present invention have an electroactive anode of the lithium alloy type, such as AlLi and/or $Li_{4.4}Sn_{22}$ or the like.

Other electrochemical devices or super condensers of particular interest include those in which the electroactive cathode is a 4 volt cathode and is preferably made from at least one oxide selected from the group consisting of $LiCoO_2$, $LiMn_2O_4$ and/or $LiNiO_2$ or compounds involving redox couples of these elements, alone or in admixture.

By way of example, a super capacitor device that is highly performing is prepared with an electroactive anode of the metallic lithium type.

It is therefore an object of the present invention to provide any electrochemical device that has a stability during cycling, as determined by the method defined in the description on page 17, that is higher than 4 volts.

DESCRIPTION OF PREFERRED EMBODIMENTS OF THE INVENTION

Figure 1:
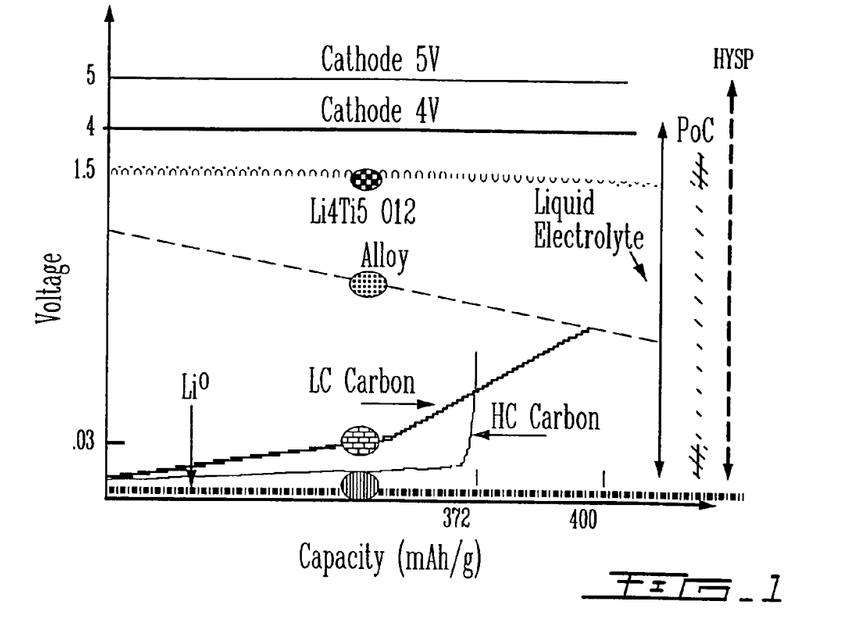
FIG. 1: illustrates the range of electrochemical stability of different anodes and cathodes; the average potential of each electrode is illustrated as a function of the stability of the polymer (HVSP) of this invention as compared to a known polyether (POC).

A first preferred embodiment of the present invention is illustrated in FIG. 1. The operation of the anodes and cathodes are represented therein by their respective average voltage.

A battery or a super condenser is generally represented as follows:

Anode/Electrolyte/Cathode: (1)

The operation of four types of anode is represented in FIG. 1, namely the following anodes:
metallic lithium;
carbon and graphite;
lithium based alloy; and
$Li_4Ti_5O_{12}$.

The operation of two types of cathode is represented in FIG. 1, namely the following cathodes:
4 volts ($LiCoO_2$, $LiMn_2O_4$, $LiNiO_2$); and
5 volts ($LiCoPO_4$, carbon with large surface area: double layer carbon).

Within the framework of the present invention, a carbon with large surface (specific) area is a carbon having a specific surface higher than 50 m²/gram. More particularly, in the case of FIG. 1, the carbon with a large surface has a surface of 80 m²/gram.

To be sure of being able to use the electrolytes of the invention, tested in all the types of electrochemical devices mentioned in FIG. 1, according to equation (I) defined above, the polymer must be stable under reduction and under oxidation. The only polymer that combines the properties mentioned above is the polymer electrolyte according to the invention, also called HVSP (chemical name). This polymer is based on a star shaped polyether having at least four branches with a hybrid termination (acrylate and alkoxy). Its stability voltage is clearly higher than 4 volts. Against all expectation, it was noted that the structure of the polymer has no effect on the chemical stability and therefore the electrochemical stability of the polymer. In a surprising and unexplained manner, it was found that the star shaped polymers having at least four branches in the electrolytes and electrolytic compositions of the invention have a range of stability that is clearly higher that the one of linear or three branched star shaped polymers mentioned above (stable at <3.9 volts).

The physico-chemical compatibility of HVSP graphite allows to form a stable passivation film at the surface of graphite and to ensure a good long term cycling property with cathodes operating at 4 volts and more.

HVSP used in this invention is manufactured by DKS Japan and is represented by commercial designation ELEX-CEL MP210-1. At room temperature, this polymer is in the form of a transparent viscous liquid and has the following physico-chemical properties:

| | |
|---|---|
| humidity in ppm | 20> |
| alkaline metallic ion (ppm, as $Na^+$) | 10> |
| chloride ion (ppm, as $Cl^-$) | 10> |
| acrylic acid (ppm) | 10> |
| molecular weight | 10100 |
| appearance* | transparent viscous liquid |

*at 25° C., viscosity is typically about 3.5 Pa × sec.

This polymer has three branches with a hybrid termination (acrylate and alkoxy). The acrylate termination serves to cross-link the polymer. Cross-linking may be carried out by using many methods, either by UV radiation, by electron beam, also called (EB) for <<electron beam>>, or by a thermic method by selecting an adequate initiator.

It appears that the acrylate, methacrylate, allyloxy or vinyloxy termination is used to ensure cross-linking of the polymer and that the alkoxy termination(s) are used to ensure stability of the polymer during oxidation. To detect the operation voltage limit of the polymer with an oxidation current, a new electrochemical method represented in FIG. 2 was used. According to this embodiment of the present invention, the cathode is a composite of a polymer and large surface area carbon dispersed on an aluminum current collector. Thanks to the surface that has been developed for carbon, this material acts as detector and can detect any oxidation current with a current intensity as low as 2 µA. The electrolyte in solid or liquid form, soaked in a microporous membrane of polyolefin type, such as Celgard®, is stable at a high voltage.

Figure 2:
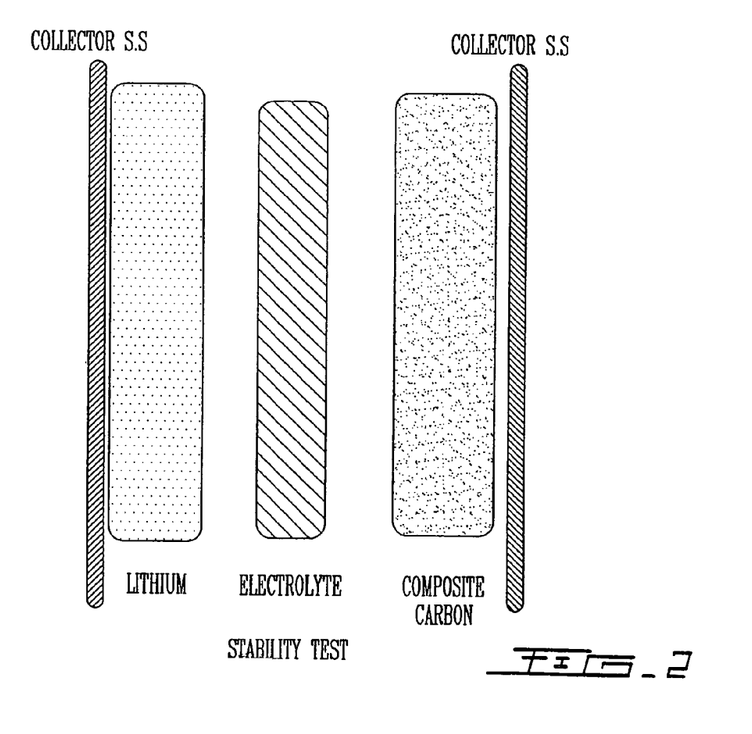
FIG. 2: illustrates an electrochemical process according to the invention to detect oxidizing current and shows the operating voltage limit of the polymer.

The anode is made of metallic lithium that serves as reference electrode and as counter-electrode.

The electrochemical method used is slow cyclovoltammetry that is used with a scanning speed of 10 mV/h. This method illustrates oxidation current as a function of voltage: each time the current is near zero, the operating voltage of the polymer is stable.

Figure 3:
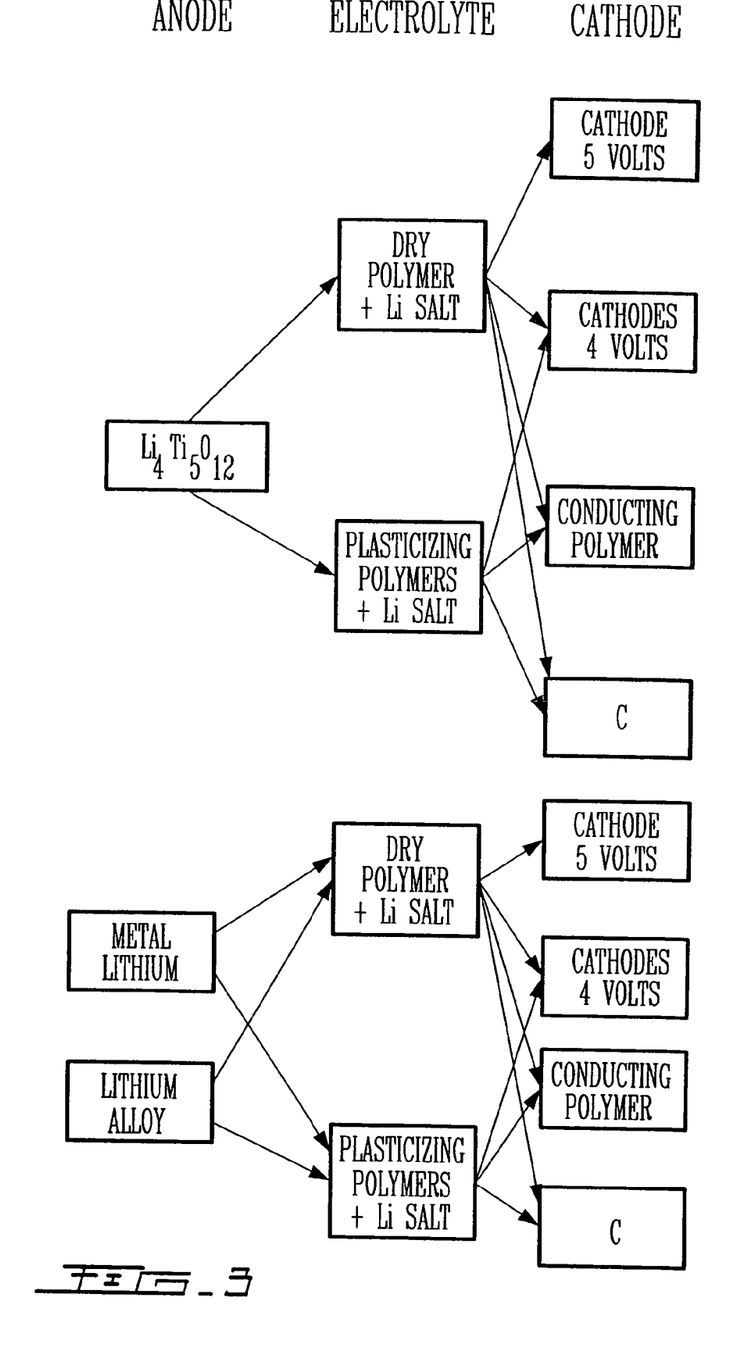
FIG. 3: illustrates the different applications of the <<High Voltage Stable Polymer>> (HVSP) as electrolyte with different anodes and cathodes for batteries and super condensers.

FIG. 3 illustrates various technological configurations capable of being advantageously applicable to HVSP polymer based electrolytes, namely:

Technology (I)—$Li_4Ti_5O_{12}$/HVSP/Carbon: Hybrid Super Condenser

In this configuration:

$Li_4Ti_5O_{12}$ represents the insertion anode, HVSP is the electrolyte and separator, the cathode is based on carbon (preferably based on graphite) of large specific area, i.e. a specific area larger than 50 $m^2$/gram and preferably between 500 and 2500 $m^2$/gram; more preferably still about 2400 $m^2$/gram (about 1200 $m^2$/gram in the case of graphite which represents the theoretic limit of the interior planes of graphite); the mechanism associated with this cathode is the double layer (CDL);

the electrolyte may appear in two forms dry and containing 40 to 85%, preferably about 50% by weight of polymer matrix, the remainder being a lithium salt or a mixture of salts to ensure ionic conductivity, the salts preferably being selected from the group comprising: $LiN(SO_2CF_3)_2$; LiTFSI, $LiN(SO_2C_2F_5)_2$; BETI; $LiC(SO_2CF_3)_2$; $LiBF_4$; $LiPF_6$; $LiClO_4$; $LiSO_3CF_3$ and $LiAsF_6$;

gel and containing from 5 to 75% by weight of ELEXCEL polymer and 95% to 25% of plasticizing agent, the plasticizing agent being a mixture of organic solvent such as: EC (ethylene carbonate), PC (propylene carbonate), γ-GBL(γ-butyrolactone), dimethyl carbonate (DMC), diethyl carbonate (DEC), TESA (tetra ethyl-sulfone amide), ethyl methyl carbonate (EMC), the salt or mixture of salts being at a concentration that varies from 0.75 to 2 moles with respect to the plasticizing agent.

The use of technology (1) allows to cause the electrode materials to operate above 4 volts. It should also be noted that the use of $Li_4Ti_5O_{12}$ requires no previous formation of the electrochemical system.

Technology (II)—Graphite/HVSP/Carbon: Hybrid Super Condenser

In this configuration, graphite constitutes the insertion anode, HVSP is the electrolyte and the separator, the cathode is based on carbon with large surface area, the mechanism associated with this cathode is of the double layer type (CDL).

The electrolyte is in two forms:

dry and containing from 40 to 85%, preferably about 50% by weight of solid polymer, the remainder consisting of a lithium salt or a mixture of salts to ensure ionic conductivity, the salts preferably being selected from the group consisting of: $LiN(SO_2CF_3)_2$; LiTFSI, $LiN(SO_2C_2F_5)_2$; BETI; $LiC(SO_2CF_3)_2$; $LiBF_4$; $LiPF_6$; $LiClO_4$; $LiSO_3CF_3$ and $LiAsF_6$;

gel and containing 5 to 75% by weight of polymer material and 95 to 25% by weight of liquid plasticizing agent, the plasticizing agent is a mixture of organic solvent such as: EC (ethylene carbonate), PC (propylene carbonate), γ-GBL(γ-butyrolactone), dimethyl carbonate (DMC), diethyl carbonate (DEC), TESA (tetra ethyl-sulfone amide), ethyl methyl carbonate (EMC), the salt or mixture of salts being present in the solvent at a concentration that varies from 0.75 to 2 moles with respect to the plasticizing agent.

The use of technology (II) enables to reach a stability for the materials >4.5 volts. The polymer electrolyte HVSP is stable under reduction and allows to possibly form a passivation film at the surface of graphite. It is stable under oxidation and can ensure good cycling properties. A <<previous electrochemical formation>> must be carried out through a suitable cycling sequence before using the electrochemical generator.

Technology (III)—$Li_4Ti_5O_{12}$/HVSP/Cathode 5 volts ($LiCoPO_4$): Li-Ion

The anode and the cathode are insertion materials, HVSP is the electrolyte.

The electrolyte is in two forms:

dry and containing 40 to 85% by weight, preferably containing about 50% by weight of polymer matrix, the remainder consisting of a lithium salt or a mixture of salts to provide ionic conductivity, the salts preferably being selected from the group consisting of: LiN(SO$_2$CF$_3$)$_2$; LiTFSI, LiN(SO$_2$C$_2$F$_5$)$_2$; BETI; LiC(SO$_2$CF$_3$)$_2$; LiBF$_4$; LiPF$_6$; LiClO$_4$; LiSO$_3$CF$_3$ and LiAsF$_6$, gel and containing from 5 to 75% by weight of gel and polymer matrix and 95 to 25% of plasticizing agent, the plasticizing agent being a mixture of organic solvents such as: EC (ethylene carbonate), PC (propylene carbonate), γ-GBL(γ-butyrolactone), dimethyl carbonate (DMC), diethyl carbonate (DEC), TESA (tetra ethyl-sulfone amide), ethyl methyl carbonate (EMC), the salt or the mixture of salts being at a concentration that varies from 0.75 to 2 moles with respect to the plasticizing agent.

Use of technology (III) enables to reach a stability for the materials >4.5 volts. The use of Li$_4$Ti$_5$O$_{12}$ requires no previous formation of the battery.

Technology (IV)—Graphite/HVSP/Cathode 5 Volts (LiCoPO$_4$): Li-Ion Batteries

In this configuration, the anode (graphite) and the cathode are insertion materials, HVSP constitutes the electrolyte and the separator. The mechanism associated with this anode is of the GIC type (graphite intercalation compound).

The electrolyte may be in two forms:

dry and containing 40 to 85%, preferably containing 50% by weight of polymer matrix, the remainder consisting of a lithium salt or a mixture of salts to ensure ionic conductivity, the salts are preferably selected from the group consisting of: LiN(SO$_2$CF$_3$)$_2$; LiTFSI, LiN(SO$_2$C$_2$F$_5$)$_2$; BETI; LiC(SO$_2$CF$_3$)$_2$; LiBF$_4$; LiPF$_6$; LiClO$_4$; LiSO$_3$CF$_3$ and LiAsF$_6$, gel and containing 5 to 75% by weight of gel and polymer matrix and 95 to 25% of plasticizing agent, the plasticizing agent being a mixture of organic solvents such as: EC (ethylene carbonate), PC (propylene carbonate), γ-GBL(γ-butyrolactone), dimethyl carbonate (DMC), diethyl carbonate (DEC), TESA (tetra ethyl-sulfone amide), ethyl methyl carbonate (EMC), the salt or the mixture of salts being at a concentration that varies from 0.75 to 2 moles with respect to the plasticizing agent.

Use of technology (IV) enables to reach a stability of the materials >4.5 volts. The HVSP polymer is stable under reduction and can form a passivation film at the surface of the graphite. It is stable under oxidation and can ensure good cycling properties. A previous formation must be carried out before the super condenser.

The following examples are given only as illustration and should not be interpreted as constituting any kind of limitation of the object of the invention.

Example 1

Test of Stability Under Oxidation of the Polymer Gel ELEXCEL MP210-1: Electrolyte and Binder 80% by weight of the four branched star shaped polymer ELEXCEL MP210-1 is mixed with 20% by weight of a PVDF (KUREHA, Japan, KF 1300) of molecular weight 500,000 g/mole, to provide the polymer matrix.

Then, 78% by weight of this polymer matrix is mixed with 22% by weight of Shawinigan carbon having a particle size between 100 nm and 250 nm.

This mixture is dispersed on an aluminum collector, and is thereafter heated during 12 hours under a flow of nitrogen. Then, drying is completed during 2 hours under vacuum. The thus obtained electrode is mounted to face a lithium metal electrode separated by a Celgard (reference 2300) soaked with a EC+DMC-1M LiClO$_4$ electrolyte.

The electrochemical test that is carried out is a slow cyclovoltammetry (10 mV/h) between 3 and 4.5 volts. In this voltage range of 3 and 5 volts, a stability under oxidation was obtained as compared to a standard three branched polyether in which the oxidation current significantly increases at about 3.9 volts.

Example 2

Test of Stability Under Oxidation of the Polymer Gel ELEXCEL MP210-1: Electrolyte A Shawinigan carbon composite (20 weight percent) is mixed with a binder of the type PVDF (80 weight percent). An electrode is prepared manually. This electrode is used as working electrode. Metallic lithium is used as a counter electrode as well as a reference in the electrochemical cell.

The polymer electrolyte is prepared by mixing polymer ERM-1 ELEXCEL (4 branches) from DKS lot 8K1201 with 1.5 M LiBF$_4$ in EC/GBL (1:3) from Tomiyama, and addition of a Perkadox 16 thermoinitiator from Akzo Nobel, in the proportions: 0.102 grams of Perkadox-16 (1000 ppm) in 100 grams of the solution ERM1(EC:GBL+LiBF$_4$), knowing that the weight ratio ERM1/EC:GBL+LiBF$_4$) is (90:10).

Figure 4:
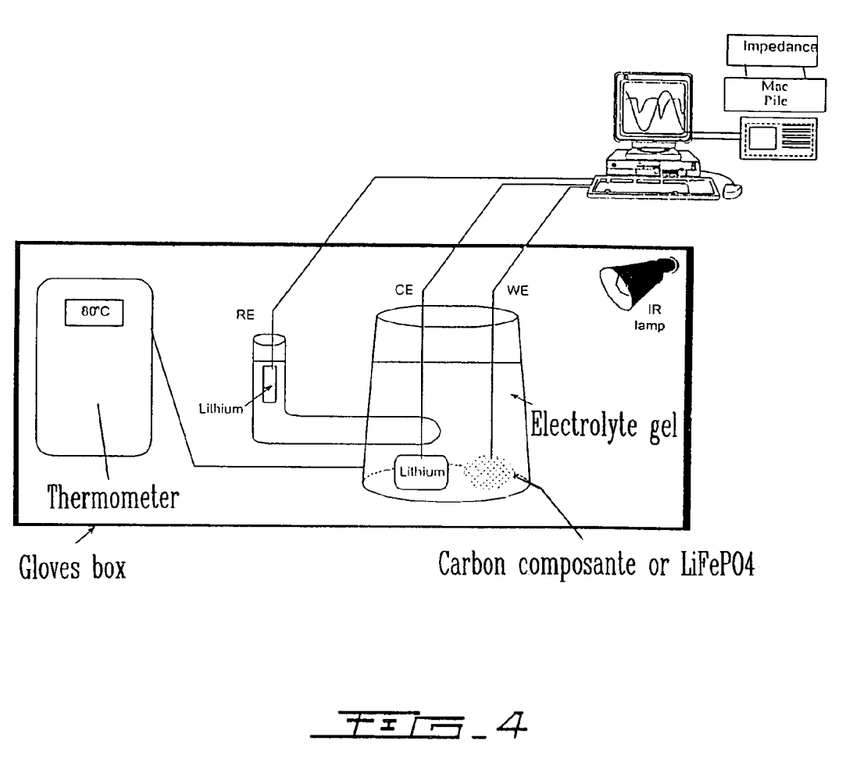
FIG. 4: illustrates the experimental device used to carry out infrared in-situ polymerization.
Figure 5:
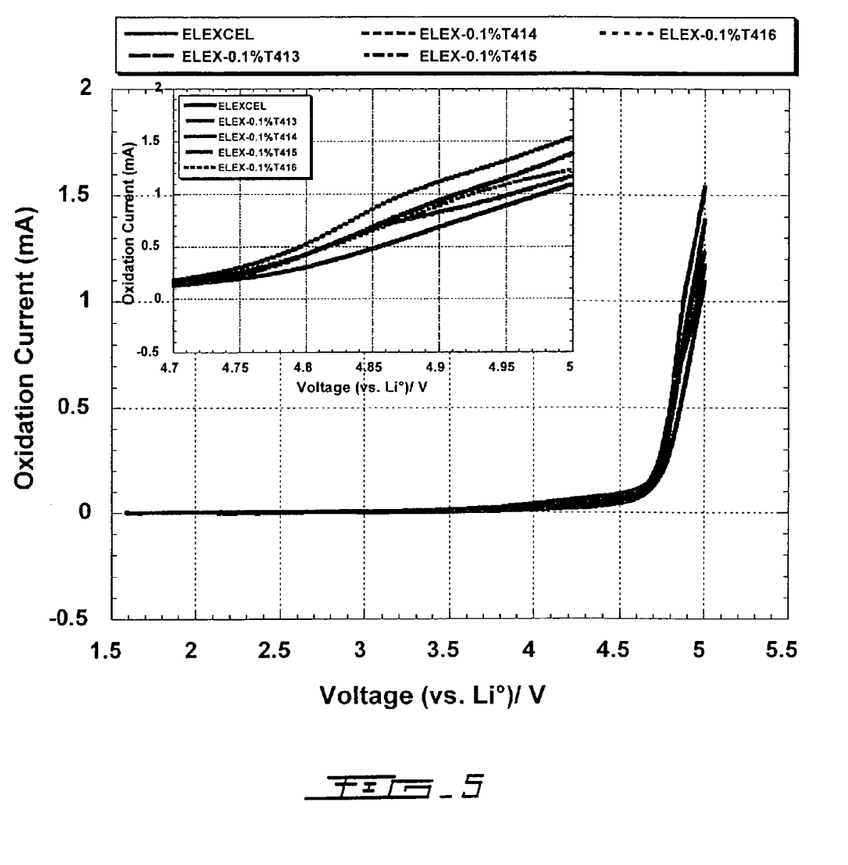
FIG. 5: illustrates the results of oxidation stability tests of different polymers without and with addition of different types of $TiO_2$.

FIG. 4 shows the experimental device used to carry out infrared in-situ polymerization, at a temperature of 80° C. After 1 hour of treatment, the gel is completely formed, and is of transparent color. The three electrodes are connected to a cycling device of the MacPile® type. The electrochemical test is carried out as in example 1. FIG. 5 shows the oxidation wall of the polymer gel: the voltage of the stability wall measured at a current value of 100 μA is 4.7 volts.

Example 3

Stability Test Under Oxidation of the Polymer Gel ELEXCEL MP2101 1/TiO$_2$ (XP-416): Electrolyte The same Shawinigan carbon composite as in example 2 is mixed with a binder of the type PVDF. An electrode is manually prepared from this composite. This electrode is used as working electrode in an electrochemical device of the three electrode type. Metallic lithium is used as counter electrode as well as reference. The polymer electrolyte is prepared by mixing polymer ERM-1 ELEXCEL (4 branches) from DKS lot 8K1201 with 1.5 mole of LiBF$_4$ in EC/GBL (1:3) from Tomiyama, and by addition of the Perkadox 16 thermoinitiator from Akzo Nobel in the proportions: 0.101 grams of Perladox 16 (1000 ppm), 100 grams of the ERM1/EC:GBL+LiBF$_4$) solution, and 0.506 grams of TiO$_2$ nano (XP-416 from Kronos). The weight ratio ERMI/(EC:GBL+LiBF$_4$) is (90:10).

FIG. 4 shows the experimental device used for infrared in-situ polymerization at a temperature of 80° C. and after 1 hour, the gel is completely formed, it is of whitish color. The three electrodes are connected to a cycling device of the MacPile® type. The stability test was carried out as in example 1. FIG. 5 shows the oxidation wall of the polymer gel: the voltage of the stability wall measured at 100 μA is 4.8 volts.

Example 4

Test of Stability Under Oxidation of the Polymer Gel ELEXCEL MP210-1/TiO2 (XP-413: Electrolyte The same Shawinigan carbon composite as in example 2 is mixed with a binder of the PVDF type. An electrode is prepared from the composite by laying the foot on an aluminum support. This electrode is used as working electrode in an electrochemical system of the 3 electrode type. Metallic lithium is used as electrode as well as reference electrode. The polymer electrolyte is prepared by mixing ERM-1 ELEX-CEL (4 branches) from DKS lot 8K1201 with 1.5 moles of $LiBF_4$ in EC/GBL (1:3) from Tomiyama, and by adding the Perkadox 16 thermoinitiator from Akzo Nobel, in the proportions of 0.050 grams of Perkadox 16 (500 ppm), 100 grams of the ERM1/(EC:GBL+$LiBF_4$) solution, 0105 gram of $TiO_2$ nano Rutile with an inorganic surface treatment ($Al_2O_3$ and $ZrO_2$) and a second organic surface treatment based on polyol (XP-413 of Kronos). Knowing that the weight ratio ERM1/(EC:GBL+$LiBF_4$) is (90:10). FIG. 4 shows the device used for the infrared in-situ polymerization test at a temperature of 80° Celsius and after 1 hour, the gel is completely formed and is of whitish color. The three electrodes are connected to a cycling device of the MacPile® type. The test for electrochemical stability is carried out as in example 1. FIG. 5 shows the oxidation wall of the polymer gel. The voltage of the stability wall measured with a current of 100 μA is 4.57 volts.

Example 5

Test of Stability Under Oxidation of the Polymer Gel ELEXCEL MP210-1/$TiO_2$ (XP-415): Electrolyte A Shawinigan carbon composite (the same as in example 2) is mixed with a binder of the PVDF type. This electrode is used as working electrode. Metallic lithium is used as counter electrode as well as reference electrode. The polymer electrolyte is prepared by mixing the polymer ERM-1 ELEXCEL (4 branches) from DKS lot 8K1201 with 1.5 moles of $LiBF_4$ in EC/GBL (1:3) from Tomiyama, and by adding the Perkadox 16 thermoinitiator from Akzo Nobel in the proportions of 0.050 gram of Perkadox 16 (500 ppm), 100 grams of the solution ERM1/EC:GBL+$LiBF_4$), and 0.105 gram of $TiO_2$ nano Rutile with an inorganic surface treatment ($Al_2O_3$, $SiO_2$ and $ZrO_2$) and a second organic treatment based on polyol. (XP-415 from Kronos). Knowing that the weight ratio ERM1/(EC:GBL+$LiBF_4$) is (90:10). FIG. 4 shows the device used for infrared in-situ polymerization. At a temperature of 800 Celcius and after 1 hour, the gel is completely formed and is of whitish color. The three electrodes are connected to a cycling device of the MacPile® type. The electrochemical stability test is carried out as in example 1. FIG. 5 shows the oxidation wall of the polymer gel. The voltage of the stability wall measured at a current value of 100 μA is 4.65 volts.

Example 6

Test of Stability Under Oxidation of the Polymer Gel ELEXCEL MP210-1/$TiO_2$ (XP-414): Electrolyte The same Shawinigan carbon composite as in example 2 is mixed with a binder of the PVDF type. This electrode is used as working electrode in a 3 electrode type system. Metallic lithium is used as counter electrode as well as reference electrode. The polymer electrolyte is prepared by mixing the polymer ERM-1 ELEXCEL (4 branches) from DKS lot 8K1201 with 1.5 mole of $LiBF_4$ in EC/GBL (1:3) from Tomiyama, and by adding the Perkadox 16 thermoinitiator from Akzo Nobel, in the proportions 0.050 gram of Perkadox 16 (500 ppm), 100 grams of the solution ERM1/EC:GBL+$LiBF_4$), and 0.108 gram of $TiO_2$ nano Rutile with an inorganic surface treatment ($Al_2O_3$) and a second organic treatment based on polyol (XP-414 from Kronos). Knowing that the weight ration ERM1/EC:GBL+$LiBF_4$) is (90:10). FIG. 4 shows the device used for the infrared in-situ polymerization tests. At 80° Celsius and after 1 hour, the gel is completely formed and is of whitish color. The three electrodes are connected to a cycling device of the MacPile® type. The electrochemical stability test is carried out as in example 1. FIG. 5 shows the oxidation wall of the polymer gel. The voltage of the stability wall, measured at 100 μA, is 4.608 volts.

Example 7

Figure 6:
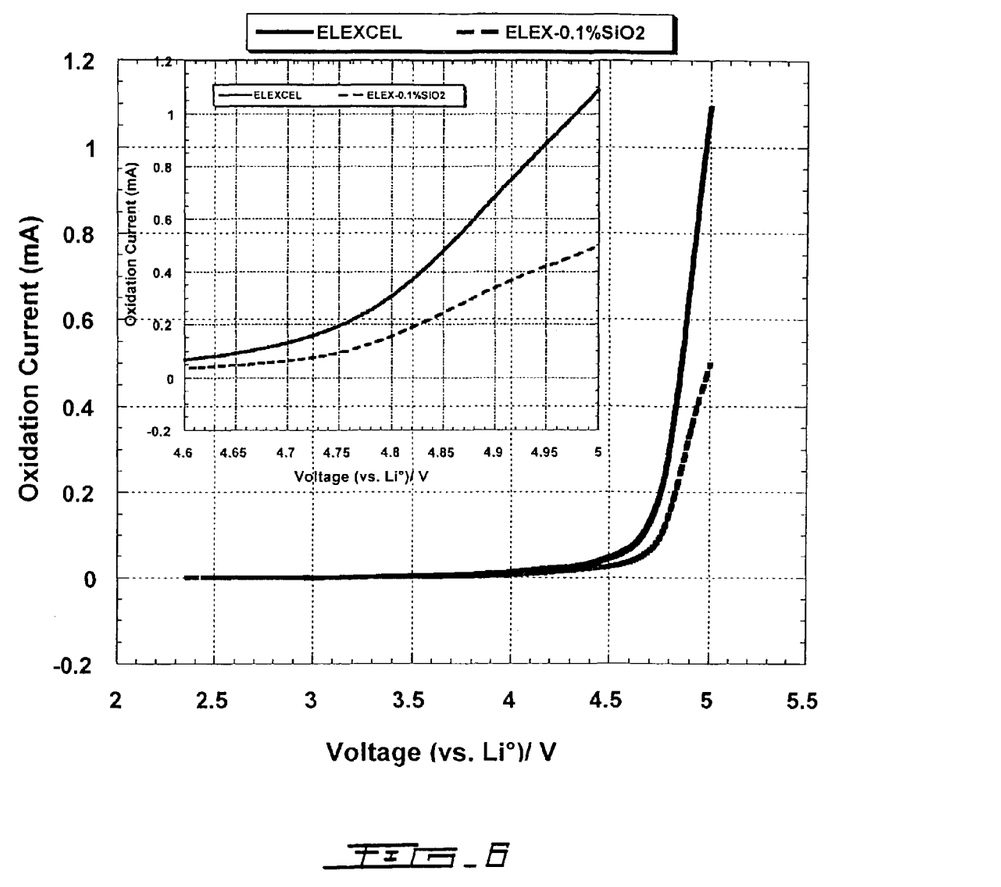
FIG. 6: illustrates the results of stability tests of the polymer without and with addition of $SiO_2$.

Test of Stability Under Oxidation of the Polymer Gel ELEXCEL MP210-1/$SiO_2$: Electrolyte The same Shawinigan carbon composite as in example 2 is mixed with a binder of the PVDF type. This electrode is used as working electrode in a 3 electrode type electrochemical system. Metallic lithium is used as counter electrode as well as reference electrode. The polymer electrolyte is prepared by mixing ERM-1 ELEXCEL (4 branches) from DKS lot 8K1201 with 1.5 mole of $LiBF_4$ in EC/GBL (1:3) from Tomiyama, and by adding the Perkadox 16 thermoinitiator from Akzo Nobel, in the proportions 0.050 gram of Perkadox 16 (500 ppm), 100 grants of the solution ERM1/EC:GBL+$LiBF_4$), and 0.103 gram of nano $SiO_2$*Aerosil from Degussa, Amorphous Fumed Silica). Knowing that the weight ratio WRM1/(EC:GBL+$LiBF_4$) is (90:10). FIG. 4 shows the device used for the infrared in-situ polymerization tests. At a temperature of 80° Celsius and after 1 hour, the gel is completely formed and is of whitish color. The three electrodes are connected to a cycling device of the MacPile° type. The electrochemical stability test is carried as in example 4. FIG. 6 shows the oxidation wall of the polymer gel. The voltage of the stability wall, measured at a current value of 100 μA, is 4.757 volts.

Example 8

Figure 7:
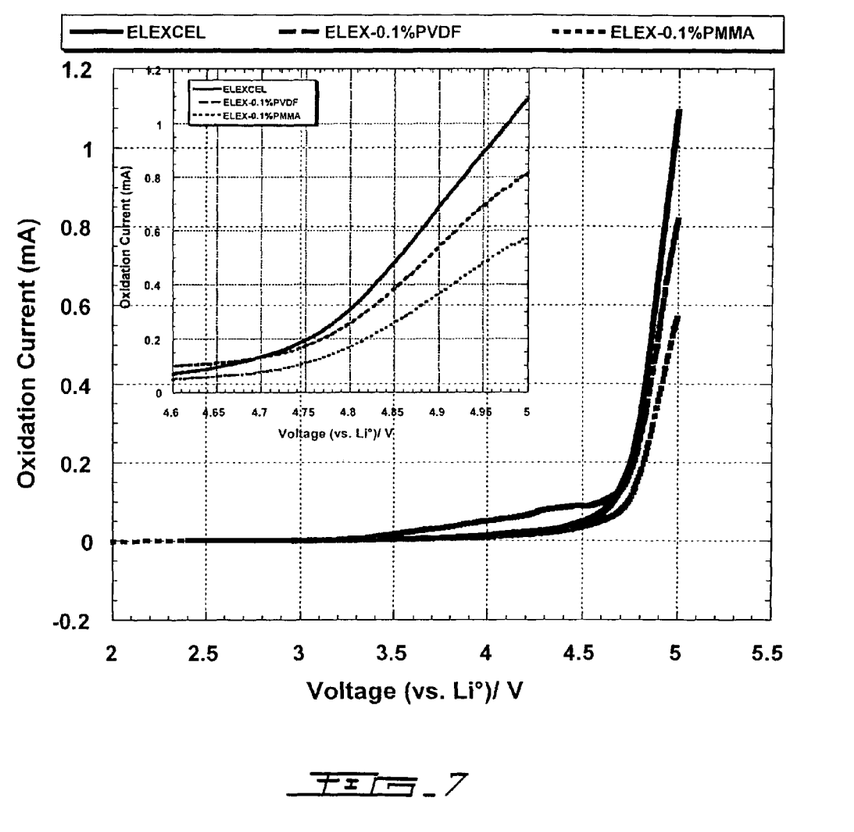
FIG. 7: illustrates the results of stability tests without and with addition of PVDF or with addition of PMMA.

Test of Stability Under Oxidation of the Polymer Gel ELEXCEL MP210-1/PVDF: Electrolyte The same Shawinigan carbon composite as in example 8 is mixed with a binder of the PVDF type. This electrode is used as working electrode in a 3 electrode system. Metallic lithium is used as counter electrode as well as reference electrode. The polymer electrolyte is prepared by mixing ERM-1 ELEXCEL (4 branches) from DKS lot 8K1201 with 1.5 mole of $LiBF_4$ in EC/GBL (1:3) from Tomiyama, and by addition of the Perkadox 16 thermoinitiator from Akzo Nobel, in the proportions 0.050 gram of Perkadox 16 (500 ppm), 100 grams of the solution ERM1(EC:GBL+$LiBF_4$), and 0.11 gram of PVDF (Kruha, Japan). Knowing that the weight ratio ERM1/(EC:GBL+$LiBF_4$) is (90:10). FIG. 4 shows the device used to carry out infrared in-situ polymerization tests. At a temperature of 80° C. and after 1 hour, the gel is completely formed, it is of whitish color. The three electrodes are connected to a cycling device of the MacPile® type. The electrochemical stability test is carried out as in example 1. FIG. 7 shows the oxidation wall of the polymer gel. The voltage of the stabiliy wall, measured at 100 μA, is 4.607 volts.

Example 9

Test of Stability Under Oxidation of the Polymer Gel ELEXCEL MP210-1/PMMA: Electrolyte The same Shawinigan carbon composite as in example 2 is mixed with a binder of the PVDF type. This electrode is used as working electrode in a 3 electrode system. Metallic lithium is used as counter electrode as well as reference electrode. The polymer electrolyte is prepared by mixing ERM-1 ELEXCEL (4 branches) from DKS lot 8K1201 with 1.5 mole of $LiBF_4$ in EC/GBL (1:3) from Tomiyama, and by addition of the Perkadox 16 thermoinitiator from Akzo Nobel, in the proportions 0.050 gram of Perkadox 16 (500 ppm), 100 grams of the solution ERM1(EC:GBL+$LiBF_4$), and 0.11 grain of PMMA (Aldrich). Knowing that the weight ratio ERM1/(EC:GBL+$LiBF_4$) is (90:10). Schematic illustration 1 shows the arrangement used to carry out infrared in-situ polymerization. At 80° C. and after 1 hour, the gel is completely formed, and is of whitish color. The three electrodes are connected to a cycling device of the MacPile® type. The electrochemical stability test is carried out as in example 1. FIG. 7 shows the oxidation wall of the polymer gel. The voltage of the stabiliy wall, measured at 100 µA, is 4.742 volts.

Example 10

Preparation of a Hybrid Super-Condenser

The anode is prepared from particles of spherical graphite whose size (after coating) is 20 µm, coated with 1% of prismatic graphite, the mixture is carried out by mechano-fusion or with a Hybridiser, 90% of graphite is mixed with 5% of STYRENE BUTADIENE RUBBER (STYRENE BUTADIENE RUBBER (SBR) Zeon) and 5% of a WSC (DKS, Japan) type thickener that is dissolved in water. An optimum concentration is selected for dispersion on copper using Doctor Blade.

The cathode is prepared from a high specific surface carbon (2000 $m^2/g$) of the PICACTIF SuperCap BP10 type, from PICA France). 20% of this carbon is mixed with 60% of STYRENE BUTADIENE RUBBER (STYRENE BUTADIENE RUBBER (SBR) Zeon) and 20 of a thickener of the type WSC (DKS, Japan) dissolved in water. An optimum concentration is selected for dispersing on aluminum using Doctor Blade.

The polymer electrolyte is formed of a solvent/polymer mixture in a weight ratio of 90/10 as described in example 2.

The electrochemical generator (hybrid super condenser) is prepared according to the principle Anode/Polymer electrolyte/Cathode.

Estimation of the electrochemical performances of the super condenser thus obtained is carried out between 0.2.5 and 4.5 volts. The average potential is 3.6 volts and its average capacitance is 0.25 mAh.

Example 11

Preparation of a Hybrid Super Condenser

The anode is formed from nano particles of $Li_4Ti_5O_{12}$ that are coated with 6% of Ketjen carbon black. Mixing is ensured by Mechano-fusion or with a Hybridiser. 90% of $Li_4Ti_5O_{12}$-carbon is mixed with 5% of STYRENE BUTADIENE RUBBER (STYRENE BUTADIENE RUBBER (SBR) Zeon) to which 5% of a WSC (DKS, Japan) type thickener dissolved in water is added. An optimum concentration is selected for dispersing on aluminum by the Doctor Blade technique.

The cathode is prepared from high surface area carbon particles (2000 $m^2/g$), of the PICACTIF SuperCap BP10 type, from PICA France). 20% of this carbon is mixed with 60% of STYRENE BUTADIENE RUBBER (STYRENE BUTADIENE RUBBER (SBR) Zeon) to which 20% of thickener of the WSC type (DKS, Japan) that is dissolved in water is added. An optimum concentration is selected for dispersing on aluminum by the Doctor Blade method.

The electrolyte is formed of a solvent/polymer mixture 90/10 weight ratio as described in example 2. The electrochemical generator (hybrid super condenser) is prepared according to the principle Anode/polymer electrolyte/cathode.

Estimation of the electrochemical properties is carried out under voltage limits between 1.5 and 2.5 volts. The average discharge potential of the hybrid super condenser is 2.25 volts, as obtained under 10 coulombs (6 min), it is 90% of the capacity and it additionally shows a very good cycling property.

Example 12

Preparation of a Li-Ion Battery

The anode is prepared from $Li_4Ti_5O_{12}$ nano particles that are coated with 6% of Ketjen carbon black. Mixing is ensured by Mechano-fusion or with a Hybridiser. 90% of $Li_4Ti_5O_{12}$-carbon is mixed with 5% of STYRENE BUTADIENE RUBBER (STYRENE BUTADIENE RUBBER (SBR) Zeon) and 5% of a thickener of the WSC type (DKS, Japan) that is dissolved in water. An optimum concentration is selected for spreading on aluminum by the Doctor Blade method.

The cathode is prepared from $LiCoPO_4$ coated with 6% of Ketjen carbon black. Mixing is ensured by Mechano-fusion or with a Hybridiser. 90% of $Li_4Ti_5O_{12}$-carbon is mixed with 5% of STYRENE BUTADIENE RUBBER (STYRENE BUTADIENE RUBBER (SBR) Zeon) and 5% of a thickener of the WSC type (DKS, Japan) that is dissolved in water. An optimum concentration is selected for dispersing on aluminum by the Doctor Blade method.

The electrolyte is prepared from a solvent/polymer mixture 90/10 weight ratio as described in example 2. The Li-ion battery is prepared according to the following principle: Anode/Polymer electrolyte/Cathode. In addition, estimation of the electrochemical performances is carried out between 1.5 and 3.3 volts. The average potential is 3.25 volts and its average capacity is 120 mAH/g.

Example 13

Stability of the Interface: Li-Metal with a Polymer Gel

Mechanical stability of lithium metal in the polymer gel was established, by using an electrochemical cell; Lithium metal//Electrolyte gel//$LiFePO_4$, the polymer gel is the same as the one used in example 1. Cycling is carried out at a rate in C/1 in charge discharge. No dendrite is formed and the lithium/polymer gel interface remains stable after more than 100 cycles.

To summarize, the electrolytes according to the invention show for example properties of being capable of easy transformation into gel or solid, are easy to handle, require no specific safety precaution, are electrochemically stable even a high voltage and are transparent in color. In solid form these electrolytic compositions may be used in the construction for example of solid batteries such as those described in the U.S. Pat. No. 6,190,804 and for example such as those described in column 2 of this document with respect to FIG. 1 of the same document.

The electrochemical compositions of the invention have for example the properties of being available in various physical forms, for example in the form of a gel or a solid, of being electrochemically stable, transparent, to have good mechanical properties, for example in solid form. The electrochemical devices of the invention on the other hand have for example the advantages of being highly performing, for example to be very stable during cycling, easy to used and not dangerous.

For the first time, electrochemical systems that are highly performing and have a stability during cycling higher than 4 volts, are made available.

Although the present invention has been described with reference to specific uses, it is understood that many variations and modifications may be related to said uses, and the present invention aims at covering such modifications, uses or adaptations of the present invention following in general, the principles of the invention and including any variation of the present description that will become known or conventional in the field of activity in which the present invention is found, and that may apply to the essential elements mentioned above, in accordance with the scope of the following claims.

The invention claimed is:

1. Polymer electrolyte for an electrochemical generator, wherein the polymer electrolyte comprises:
    (a) at least one four-branched polymer having a hybrid termination, wherein at least one branch of said four branched polymer is capable of giving rise to cross-linking; with
    (b) at least one component selected from the group consisting of $SiO_2$, $Al_2O_3$, nano $TiO_2$ noncoated, nano $TiO_2$ coated with an organic material that is compatible with a tetrafunction terminal acryloyl-modified alkylene oxide polymer, the organic material being selected from at least one polyol or at least one polyethylene-polyoxyethylene copolymer and nano TiO2 coated with an inorganic material selected from $SiO_2$ and $Al_2O_3$,
    wherein the polymer electrolyte exhibits a stability voltage higher than 4 volts.

2. Polymer electrolyte according to claim 1, further comprising a salt with a plasticizing agent or a mixture of salts with a plasticizing agent.

3. Polymer electrolyte according to claim 2, in dry form (free solvent), obtained by adding a lithium salt or a mixture of salts (in the matrix) of the polymer in order to provide ionic conductivity.

4. Polymer electrolyte according to claim 3, in which the lithium salts are selected from the group consisting of $LiN(SO_2CF_3)_2$; LiTFSi; $LiN(SO_2C_2F_5)_2$; BETI; $LiC(SO_2CF_3)_3$; $LiBF_4$; $LiPF_6$; $LiClO_4$; $LiSO_3CF_3$; and $LiAsF_6$.

5. Polymer electrolyte according to claim 2, in which the plasticizing agent is comprised of at least one organic solvent selected from the group consisting of: an ethylene carbonate, a propylene carbonate, a γ-gamma butyrolactone, a dimethyl carbonate, a diethyl carbonate, a tetra ethyl-sulfone amide, and a methyl-ethyl carbonate (EMC).

6. Polymer electrolyte according to claim 1, wherein the stability voltage is higher than 4.5 volts.

* * * * *